United States Patent [19]

Pravda

[11] Patent Number: 5,945,031
[45] Date of Patent: Aug. 31, 1999

[54] FREEZE RESISTANT, PERKINS TUBE TYPE HEAT EXCHANGER

[75] Inventor: Milton F. Pravda, Towson, Md.

[73] Assignee: Conserve Resources, Inc., Prescott, Wash.

[21] Appl. No.: 09/083,897

[22] Filed: May 22, 1998

[51] Int. Cl.$^6$ ....................................................... C09K 5/00
[52] U.S. Cl. ................................ 252/70; 252/67; 252/68; 106/13
[58] Field of Search ................................ 252/70, 67, 68; 106/13

[56] References Cited

U.S. PATENT DOCUMENTS

| | | | |
|---|---|---|---|
| 4,857,222 | 8/1989 | Itoh et al. | 252/69 |
| 4,877,080 | 10/1989 | Ryham | 165/2 |
| 5,016,448 | 5/1991 | Plzak | 62/476 |
| 5,108,638 | 4/1992 | Iizuka et al. | 252/69 |
| 5,123,479 | 6/1992 | Pravda | 165/86 |
| 5,255,534 | 10/1993 | Ryan | 62/476 |

OTHER PUBLICATIONS

Japio Patent Abstract No. JP357074549A, abstract of Japanese Patent Specification No. 57–074549, May 1982.
Japio Patent Abstract No. JP361281856A, abstract of Japanese Patent Specification No. 61–281856, Dec. 1986.

*Primary Examiner*—Anthony Green
*Attorney, Agent, or Firm*—Olson and Olson

[57] ABSTRACT

A freeze resistant aqueous coolant solution for use in Perkins tube type heat exchangers is formed of one or more metal salts selected from the alkali metals of Group IA and the alkaline earth metals of Group IIA of the Periodic Table. Depending upon the composition of the metal tubes of the heat exchanger, the concentration of the metal salt ranges from about 5% to about 10% by weight of the solution and the pH of the solution ranges between 7.3 and 11.5.

6 Claims, 1 Drawing Sheet

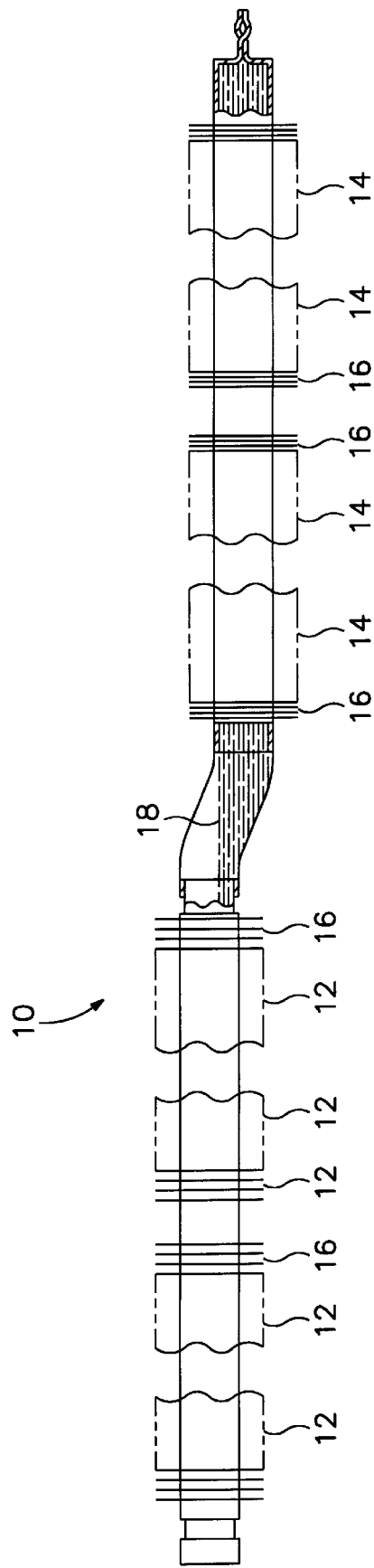

5,945,031

FREEZE RESISTANT, PERKINS TUBE TYPE HEAT EXCHANGER

BACKGROUND OF THE INVENTION

This invention relates to freeze-resistant, Perkins tube type heat exchangers, e.g. rotating Perkins tube type heat exchangers of the class disclosed in my earlier U.S. Pat. No. 5,123,479.

Perkins tubes are hermetically sealed enclosures wherein a part of the internal volume contains a working fluid and wherein all non-condensible gases are evacuated prior to closure. One of the first commercial applications of Perkins tubes was in ovens employed to bake bread. Over a century ago, Perkins tubes were made from Swedish iron, half-filled with water which was then brought to a boil, and the resulting steam drove out the air within the tube prior to crimping the open end and hermetically sealing it by welding. These tubes were installed by inclining one end into the wood or coal fire and permitting the tubes to pierce the oven wall and protrude into the bread-baking region. Thereby, the bread product would be free of wood and coal gas-contamination products. These ovens were located indoors and not ordinarily subject to freezing. If occasional freezing occurred, the tubes were short enough such that the contained water froze uniformly and no physical damage was experienced. This has been confirmed experimentally by freezing inclined (ordinary) tubes half filled with pure water.

It has been observed, however, that when the Perkins tube is partially finned externally, the freezing of water within the tube is not uniform. This obtains because, where the tube is finned externally, airside heat transfer is increased substantially from the outer tube-wall surface. This increased heat transfer causes the water within this portion of the Perkins tube to freeze first, causing an ice plug to form. This ice plug adheres to the inner tube wall surface and effectively forms a seal. Subsequently, water within the unfinned section, which is trapped by this plug, freezes; and, because the volume of ice is larger than the equivalent volume of water, the trapped water, upon freezing, expands the tube. Subsequent repetitions of this process cause eventual failure of the Perkins tube. This has been observed experimentally at the ends of the Perkins tube of the type used in the rotating heat exchanger described in the aforementioned U.S. Pat. No. 5,123,479.

Water is the preferred working fluid because it has been found to be compatible with copper and copper/nickel alloys up to its critical temperature; because it is nontoxic, because it is environmentally acceptable; because it is the most excellent heat transfer fluid in existence; because it is thermally stable to above its critical temperature; and because it will not fuel fires. It is unique among materials in that it expands upon freezing and, therein, it causes problems when it is used in pure form in finned heat exchangers, particularly of the type disclosed in U.S. Pat. No. 5,123,479 aforesaid.

It is noted that brines of calcium chloride and sodium chloride have been in use for many years as secondary coolants. Both calcium and sodium chloride brines are corrosive and the commonly used corrosion inhibitors have been sodium chromate in concentrations of 2 to 4 percent and pH control between 6.5 and 8.5. Because chromates are carcinogens, they have recently been replaced by sodium nitrite in concentration between 3% and 4% and pH control between 7.0 and 8.5. The 50% lethal concentration of sodium nitrate in humans is 0.3 weight percent in body tissue; and, therefore, their use in food applications is limited. organic inhibitors, which are stable at low brine temperatures, have replaced nitrites in systems employing brines in food applications. However, organic inhibitors are unstable at the high temperatures which are encountered in some Perkins tube usage.

SUMMARY OF THE INVENTION

This invention provides a Perkins tube type heat exchanger with a freeze resistant aqueous coolant solution of water soluble salts selected to reduce the tensile strength and adhesive shear stress of ice mixtures and to be non-corrosive to the Perkins tube material.

It is the principal objective of this invention to provide for Perkins tube type heat exchangers a coolant solution that overcomes the aforementioned limitations and disadvantages of prior coolants.

Another objective of this invention is the provision of an aqueous coolant solution of the class described that is safe to handle, inexpensive and do not contribute non-condensible gases to the evaporation and condensation processes of the water.

A further objective of this invention is to provide a coolant solution of water soluble salts that is not corrosive to Perkins tube material and is suitable for use in heat exchangers employed in the food industry.

The foregoing and other objects and advantages of this invention will appear from the following detailed description, taken in connection with the accompanying drawing of a preferred embodiment.

BRIEF DESCRIPTION OF THE DRAWING

The single figure of the drawing is a foreshortened elevation, partly in section, of a Perkins tube type heat exchanger of the class embodying the features of this invention.

DESCRIPTION OF THE PREFERRED EMBODIMENT

In accordance with the present invention it has been demonstrated through experimentation with metal silicates, sulfates, halides, and carbonates that, of these, some metal halides of the Groups IA and IIA metals of the Periodic Table are particularly effective in reducing the tensile strength and adhesive shear stress of frozen mixtures. For example, lithium bromide at low-weight percents produces a fragile ice of very low tensile strength. A 9% by weight solution of lithium bromide will not fracture a 90% copper, 10% nickel tube when a partly filled tube, the end of which is insulated, is subject to freezing at 0° Fahrenheit. Furthermore, after 20,000 hours of testing in a reflux mode at 350° F., no gas generation and only minor corrosion was observed. Such salts accordingly may be used to advantages as anti-freeze components of the aqueous mixtures employed in Perkins tube type heat exchangers.

The selected halides of the Groups IA and IIA metals must be soluble in water. This excludes substances such as calcium fluoride. Also, they must have a very low vapor pressure so that they do not contribute noncondensible gases to the evaporation and condensation process of the water. Of course, they must be safe to handle, must be inexpensive and must effectively reduce the tensile strength and adhesive shear stress of ice mixtures. obviously, the halides must be thermally stable up to the critical temperature of water and must not corrode the tube material within which they are contained.

Since some applications of the rotating heat exchanger are in the food industry, the preferred anti-freeze additive to water is sodium chloride because of its widespread use in food products. Adhesive shear stresses of various concentrations of sodium chloride in 2 megohm resistance deionized water were measured at 0° Fahrenheit. The shear stress values in pounds per square inch (psi) of various concentrations in contact with a copper wall are:

| W %/NaCl | Shear Stress, psi |
|---|---|
| 3 | 85 |
| 5 | 49 |
| 6 | 36 |
| 7 | 26 |
| 8 | 20 |
| 9 | 15 |

Test results could not be obtained with the apparatus for pure deionized water frozen at 0° Fahrenheit because the capacity of the test apparatus, which was 600 psi, was exceeded.

Typical adhesive shear stress of various other salts at a concentration of 6% by weight for a copper wall at 0° Fahrenheit are:

| Material | Shear Stress (psi) |
|---|---|
| Lithium Bromide | 50 |
| Lithium Chloride | 20 |
| Calcium Chloride | 32 |
| Sodium Sulfate | 30 |
| Sodium Metasilicate | 40 |
| Potassium Carbonate | 110 |
| Potassium Iodide | 130 |

Lithium bromide, sodium chloride, and sodium iodide are known as neutral salts and do not appreciably hydrolize in water. Calcium chloride hydrolizes somewhat as do the alkaline salts, such as sodium metasilicate and potassium carbonate, which, at a concentration of 10% by weight, yield a pH of between 12 and 13. Although the salt sodium chloride was selected because of food application concerns, the use of other Group IA and IIA metal salts is not precluded.

A Perkins tube from pure copper and of the design disclosed in my U.S. Pat. No. 5,123,479 was constructed. The evaporator was heated with a wrap-around electric heater and the condenser was cooled by air convection. The composition of the working fluid was 7% by weight J. T. Baker, Inc., industrially-pure sodium chloride dissolved in 2 megohm deionized water. The pH of the solution was measured as 7.3. After 2808 hours of operation at 230° F., the tube was sectioned. It was observed that at the vapor-to-liquid interface in the evaporator, just below the liquid level, serious erosion of the copper occurred; and, just above the vapor-to-liquid interface, pure copper crystals were deposited. This phenomenon was most severe in the region of the elbow where the concentration gradients were the highest and much less severe at the end cap region of the evaporator section where the concentration gradients were the lowest. As expected, no corrosion or erosion occurred in the condenser since this was the area containing pure condensed water.

A series of furnace tests on small copper tubes was conducted at 375° F. for a period of 6 months. A solution of 6.5% by weight of sodium chloride was dissolved in 2 megohm deionized water. The pH was adjusted with sodium hydroxide, obtained from Fisher Scientific, between values of 7.3 to 11.8. After 6 months, the samples were sectioned and it was observed that the erosion/corrosion decreased as pH increased up to a pH value of 11 at which pH there was no corrosion; and, at a pH of 11.8, some evidence of caustic corrosion was observed.

A Perkins tube was constructed from pure copper and charged with a solution of 8% by weight of sodium chloride in 2 megohm deionized water. The pH was adjusted to 11. The evaporator was heated electrically, as previously described, and air cooled. The operating temperature during steady-state was 130° F.; however, during periodic transport testing, the temperature increased to 300° F. After 14,700 hours, the testing was discontinued and the Perkins tube was sectioned. No evidence of corrosion/erosion was observed.

As noted, other salts may be used to weaken the adhesive shear stress of ice. Whenever another metal halide is selected, the hydroxide of that metal should be used, if it is sufficiently soluble, to adjust the pH in order to avoid introducing foreign species of cations. No pH adjustment is required for alkaline salts.

EXAMPLE

A rotary heat exchanger of the type disclosed in my U.S. Pat. No. 5,123,479 has been installed in the exhaust side of a baking oven. Referring to the drawing, the total length of each Perkins tube component 10 of the heat exchanger is 79.35 inches. Each tube 10 consists of an evaporating section 12 and a condensing section 14.

The condensing, shorter section 14 of the tube is 30 inches, including the fill tube cap. The tube material is 90% copper, 10% nickel alloy, and externally there are aluminum fins 16, 11 per inch except for 0.9 inch at its midpoint and 1.3 inches at the fill tube end, but not including the fill tube itself. It has been demonstrated by freezer testing that the 0.9 inch and the 1.3 inches are the last to freeze because these sections are surrounded by heavy metal sections which restrict airside heat transfer, whereas the thin aluminum fins greatly enhance airside heat transfer. The ice plug that initially forms in those Perkins tubes which are completely filled with water, when the rotating heat exchanger is not operating, is 30−0.9−1.3=27.8 inches long. The force required to move this plug and thus relieve the expansion stresses in the confined freezing water in the 0.9 and 1.3-inch sections is the product of the adhesive shear stress of the ice at the copper/nickel inner tube surface and the surface area over which it acts. At a sodium chloride concentration of 6.5 weight percent, the adhesive shear stress of the frozen plug to copper at 0° F. was determined to be 31 pounds per square inch and the resulting force, for the tube which has an internal diameter of 0.93 inch, is 2518 pounds. The copper/nickel tube wall thickness is 0.035 inch; therefore, the tensile strength in the tube wall is approximately 49,000 pounds per square inch. Since this is below the 57,000 pounds per square inch yield strength for light-drawn 90% copper, 10% nickel alloy tube material, there will be no freeze-thaw tube failures.

The Perkins tubes of this heat exchanger were charged with a working fluid 18 comprising a 6.5% by weight solution of sodium chloride in 2 megohm deionized water. The pH was adjusted with sodium hydroxide to a value of between 10.0 and 10.5. A lower pH was justified in this installation because of the demonstrated greater resistance to erosion and corrosion of this copper/nickel alloy and because the manufacturing process employed to charge the Perkins tubes was believed to increase pH and sodium chloride concentration.

After the heat exchanger had been in operation through two severe winters, six Perkins tubes were removed and examined. Two of the six tubes removed had a history of rework during the initial manufacture and, although they do not show any evidence of freezing damage, they are excluded from further comments. Thermal testing of each of the four remaining Perkins tubes indicated absolutely no evidence of noncondensible gas generation. As expected, the pH values varied between 11.0 and 11.1 and the sodium chloride concentration varied from 7.4% to 7.8% by weight. The working fluid was very clear and there was no evidence of dissolved copper. Examination of the inner surfaces of each tube showed no evidence of erosion or corrosion and all surfaces exhibited a bright metal finish.

As illustrated in the aforementioned example, the allowable adhesive shear stress of the frozen working fluid is dependent upon the room-temperature yield strength of the Perkins tube wall material. The expression for the maximum adhesive shear stress of the working fluid is given by:

$$S_s = tS_y/2L$$

where $S_s$ is the adhesive shear stress of the frozen working fluid in psi, t is the tube wall thickness in inches, $S_y$ is the yield strength of the tube wall material in psi, and L is the length of the section of frozen working fluid in inches. The actual yield strength of the tube material cannot be exceeded because successive yields, no matter how small, will eventually, over many freeze-thaw cycles, cause failure. Therefore, the concentration of the salt must be high enough so that, at the lowest ambient temperature, the frozen plug within the Perkins tube will move in order to relieve the stresses before the yield stress of the Perkins tube wall is exceeded.

Secondary coolants, such as brines of sodium or calcium chloride, aqueous solutions of propylene or ethylene glycol, aqueous solutions of alcohol, etc., have been employed for many years in refrigeration plants and in freeze-resistant engine-cooling radiators. All have water as a common base, because of its superior thermal properties. All compositions remain liquid at the design operating temperature and these liquids are used in systems which do not require boiling or condensing phases of these liquids.

It is known that when salts are added to water, the vapor pressure is lowered (boiling temperature is elevated). Therefore, the vapor condensing temperature is also lowered. When an aqueous salt is employed as the working fluid in a Perkins tube, the temperature difference between the exhaust and supply airstreams must be higher to compensate for this vapor pressure lowering in order to transfer the same quantity of thermal energy. For example, aqueous salt solutions which remain liquid at 0° F. will elevate the boiling temperature by 10° F. for sodium chloride, 7° F. for calcium chloride and 20° F. for lithium bromide. Obviously, it is desired to minimize this thermal penalty by minimizing the concentration of the salt in the working fluid.

The useful aqueous salt solutions encompass potassium chloride, bromide, iodide and fluoride; potassium nitrate, hydroxide, chromate, and carbonate; sodium chloride, bromide, and iodide; sodium nitrate, chlorate, bromate, hydroxide, chromate and carbonate; lithium chloride, bromide and iodide; lithium chlorate, bromate, iodate, sulfate and chromate; silver fluoride, nitrate and chlorate; barium chloride, bromide, and iodide; barium chlorate; strontium chloride, bromide and iodide; strontium chlorate and bromate; calcium chloride, bromide and iodide; calcium nitrate, chlorate and bromate; magnesium chloride, bromide and iodide; magnesium chlorate, bromate, sulfate, and chromate; zinc chloride, bromide and iodide; zinc nitrate, chlorate, bromate and sulfate; and lead nitrate and chlorate.

It will be apparent to those skilled in the art that various changes may be made in the parameters of the solutions described hereinbefore, without departing from the spirit of this invention and the scope of the appended claims.

I claim:

1. A freeze resistant solution for use in the evaporation and condensation process of water in hermetic Perkins tube heat exchangers, comprising an aqueous solution of 5–10 percent by weight of one or more water soluble salts of metals selected from the group consisting of the Group IA and IIA metals of the Periodic Table, the aqueous solution being free of noncondensible gases entering the evaporation and condensation process of water in the perkins tube, the salt concentration of the solution being sufficient to reduce the tensile strength of ice mixtures and adhesive sheer stress of ice mixtures to magnitudes below the yield strength of the Perkins tube, and the solution having a pH between 7.3 and 11.5 to prevent corrosion of the tube.

2. The freeze resistant solution of claim 1 wherein the aqueous solution is made of 2 megohm deionized water.

3. The freeze resistant solution of claim 1 wherein the aqueous solution includes 6–8% by weight sodium chloride.

4. The freeze resistant solution of claim 1 wherein the aqueous solution includes 9% per weight lithium bromide.

5. The freeze resistant solution of claim 1 comprising 5–10% by weight of one or more of the salts selected from the group consisting of potassium chloride, bromide, iodide and fluoride; potassium nitrate, hydroxide, chromate and carbonate; sodium chloride, bromide, and iodide; sodium nitrate, chlorate, bromate, hydroxide, chromate and carbonate; lithium chloride, bromide, and iodide; lithium chlorate, bromate, iodate, sulfate and chromate; silver fluoride, nitrate and chlorate; barium chloride, bromide and iodide; barium chlorate; strontium chloride, bromide and iodide; strontium chlorate and bromate; calcium chloride, bromide and iodide; calcium nitrate, chlorate and bromate; magnesium chloride, bromide and iodide; magnesium chlorate, bromate, sulfate and chromate; zinc chloride, bromide and iodide; zinc nitrate, chlorate, bromate and sulfate; and lead nitrate and chlorate.

6. The freeze resistant solution of claim 1 wherein the metal salt is the hydroxide of the metal.

* * * * *